G. TSEKURAS.
COOKING DEVICE.
APPLICATION FILED OCT. 18, 1919.

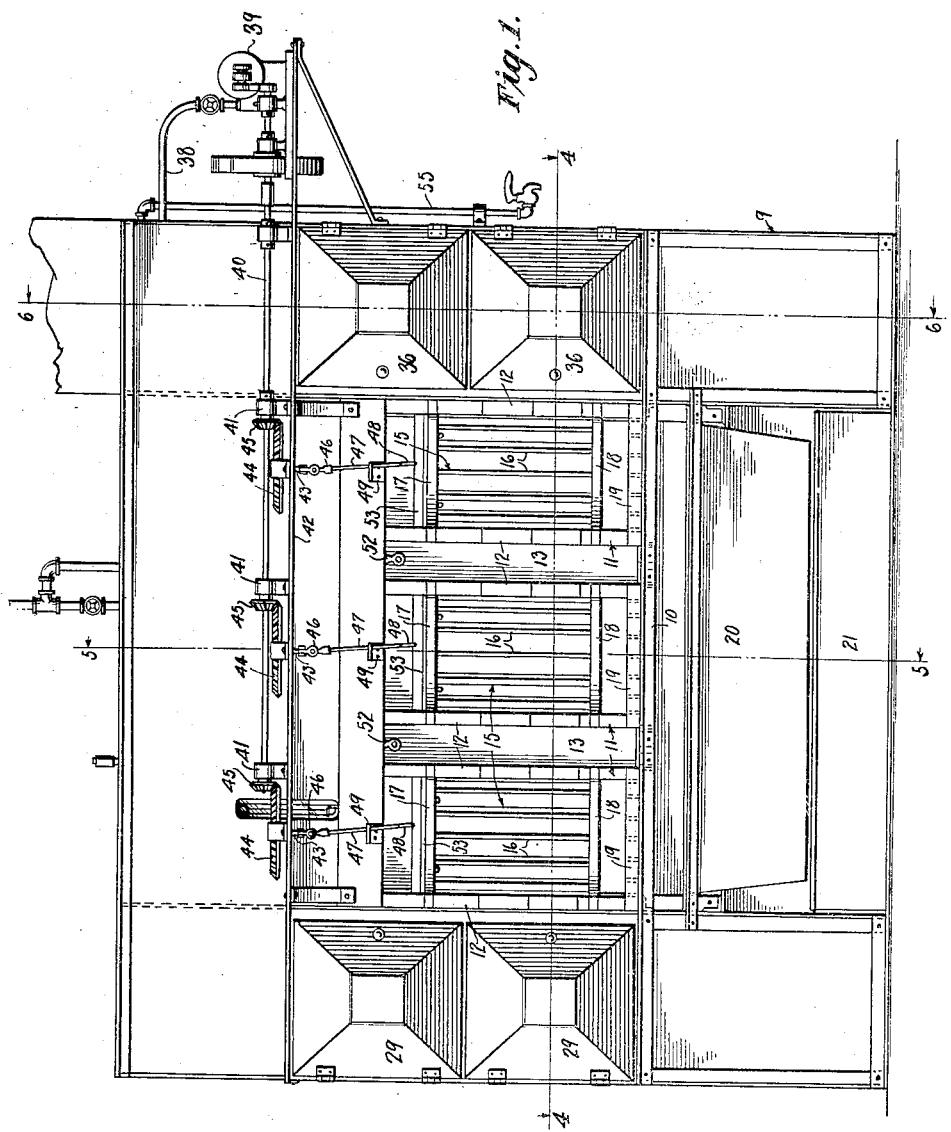

1,336,599.

Patented Apr. 13, 1920.
5 SHEETS—SHEET 2.

Witnesses
W. C. Fielding
Augustus B. Copper

Inventor
George Tsekuras
By Jochus R. H. Totts
His Attorney

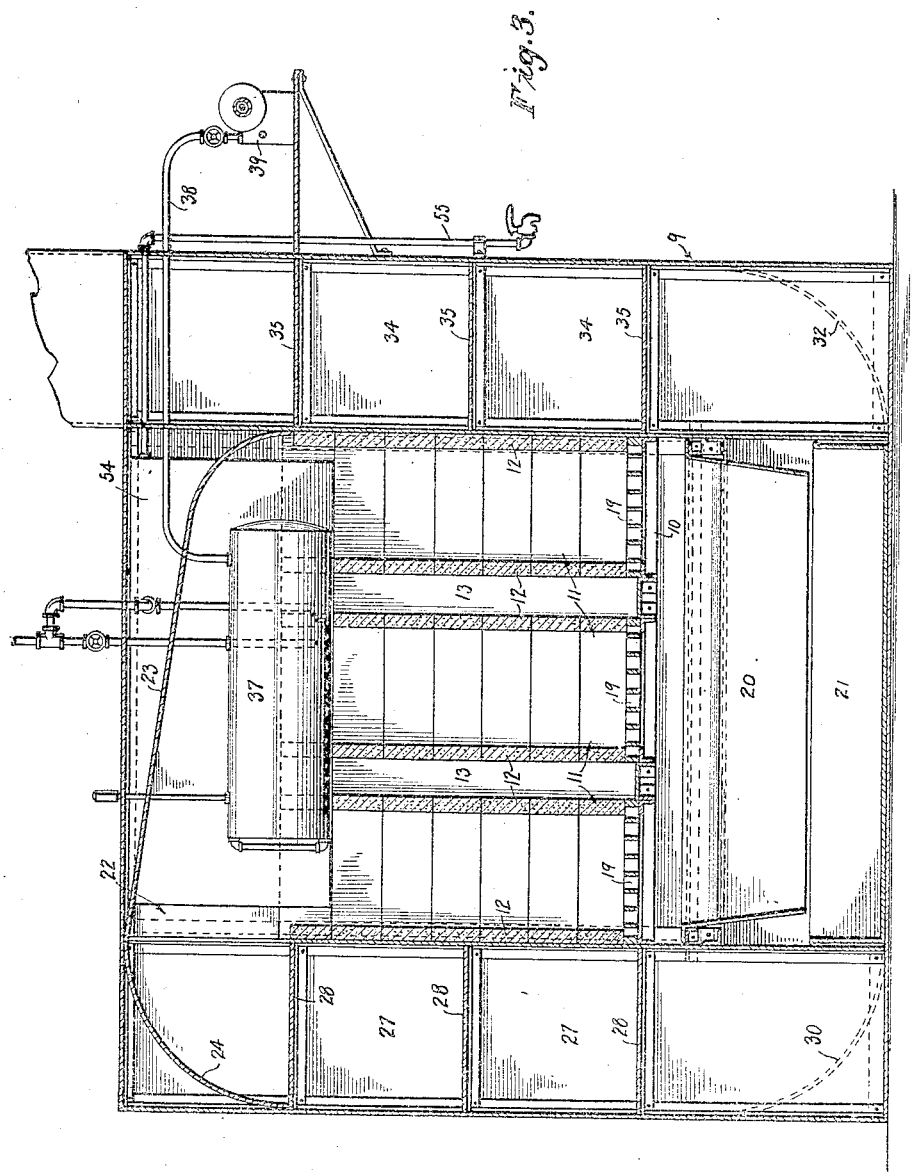

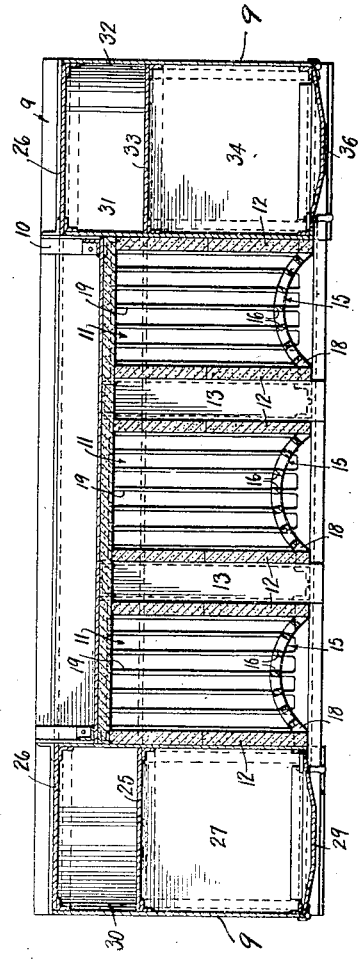
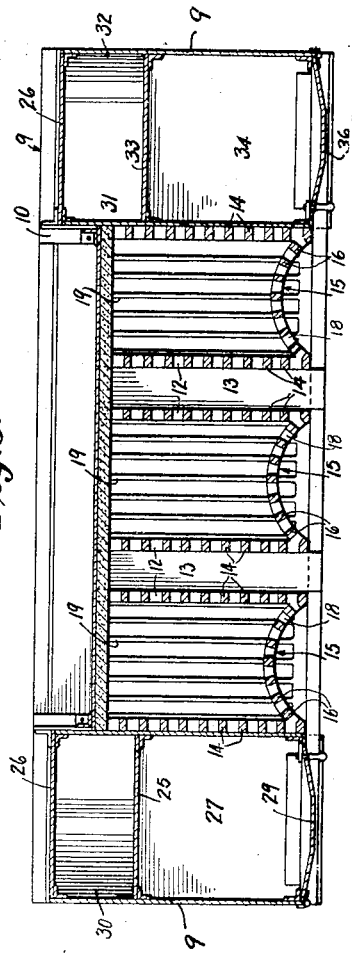

G. TSEKURAS.
COOKING DEVICE.
APPLICATION FILED OCT. 18, 1919.

1,336,599.

Patented Apr. 13, 1920.

Witnesses
W. C. Fielding
Augustus B. Copper

Inventor
George Tsekuras
By Joshua R. H. Potts
His Attorney

UNITED STATES PATENT OFFICE.

GEORGE TSEKURAS, OF PHILADELPHIA, PENNSYLVANIA.

COOKING DEVICE.

1,336,599.      Specification of Letters Patent.      Patented Apr. 13, 1920.

Application filed October 18, 1919. Serial No. 331,688.

*To all whom it may concern:*

Be it known that I, GEORGE TSEKURAS, a citizen of the United States, residing at Philadelphia, in the county of Philadelphia and State of Pennsylvania, have invented certain new and useful Improvements in Cooking Devices, of which the following is a specification.

One object of my invention is to provide an improved cooking device which will be well adapted for use in restaurants and hotels and which will be capable of simultaneously roasting, broiling and baking food.

Another object is to so arrange the parts of my improved device that the heat from the heating agent will pass from fire boxes through a flue in such manner as to generate steam for operating rotatable food-supporting devices and will also heat water for kitchen purposes.

A further object is to so construct my improved cooking device that it will serve to simultaneously broil the opposite sides of steaks, chops, etc., so that they will be evenly cooked.

A further object is to so construct my invention that the parts thereof can be readily cleaned or replaced.

These objects, and other advantageous ends which will be described hereinafter, I attain in the following manner, reference being had to the accompanying drawings in which—

Fig. 3 is a sectional elevation taken on the line 3—3 of Fig. 2,

Fig. 4 is a sectional plan view taken on the line 4—4 of Fig. 1,

Fig. 7 is a perspective view of a supporting bracket which forms a part of my invention, and Fig. 8 is a view of similar nature to Fig. 4 showing a slight modification of my invention.

Figure 2:
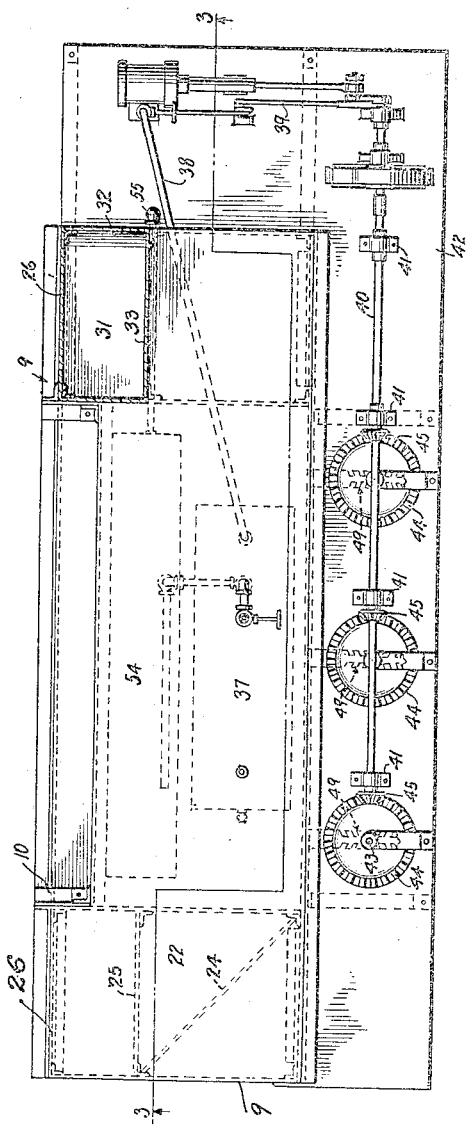
Fig. 2 is a top plan view of Fig. 1.
Figure 1:
Figure 1 is a front elevation of my improved cooking device.
Figure 6:
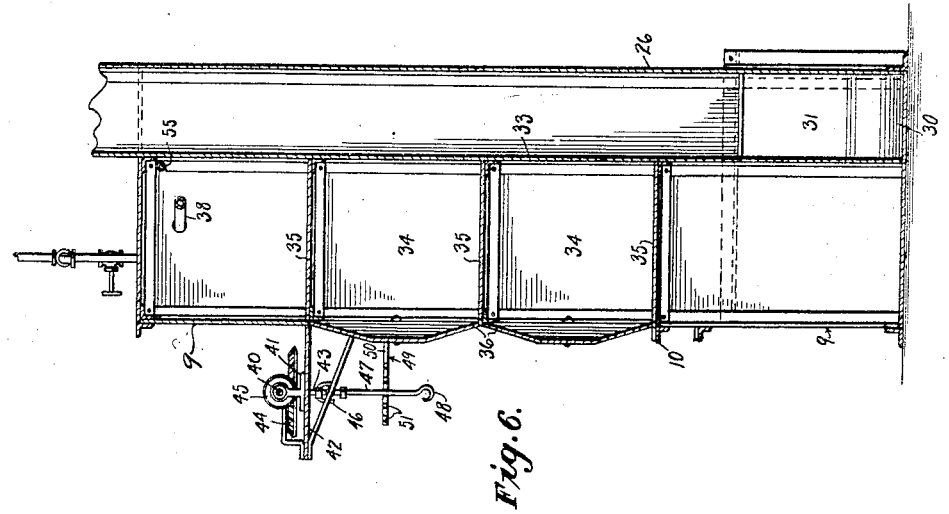
Fig. 6 is a transverse sectional elevation taken on the line 6—6 of Fig. 1.
Figure 5:
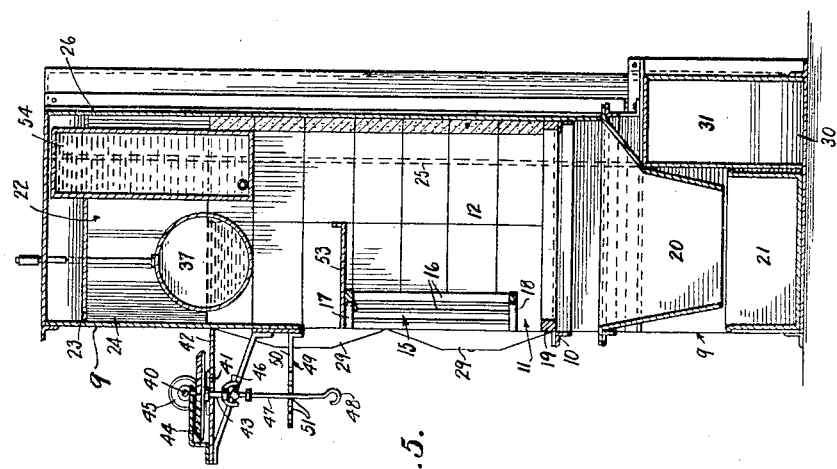
Fig. 5 is a transverse sectional elevation taken on the line 5—5 of Fig. 1.

Referring to the drawings, 9 represents a casing having a horizontally positioned frame 10 supported therein above the bottom of the casing, and this frame in turn forms a support for fire boxes 11, said fire boxes having side walls 12 and being spaced apart to provide alleys 13. The side walls 12 can be made of fire brick as shown in Figs. 1 to 6 inclusive or they can be made of grate bars 14 as shown in the modification in Fig. 8. The fire boxes have front grates 15 which include upright bars 16 spaced apart and are arranged in arcuate formation inwardly, as clearly shown in Figs. 4 and 8. The bars 16 at their tops are connected to rails 17 and at their bottoms are connected to rails 18, said rails being supported in the side walls 12 above the frame 10. The frame 10 supports bottom grates 19 which are preferably spaced below the rails 18 in order to permit the raking of the fire within the fire boxes, it being noted that coal, coke or other suitable fuel can be burnt within the fire boxes.

A chute or hopper 20 is positioned within the space below the frame 10 and serves to deflect the ashes which fall through the grates 19, into an ash receptacle 21. A flue 22 is provided within the casing 10, said flue being formed by the inclusion of a baffle 23 which is positioned above the fire boxes, said baffle leading at an angle upwardly and having a curved portion 24 which extends downwardly at one side of the casing. A plate or partition 25 extends downwardly at one side of the casing and is spaced from the back 26 of the casing to provide a downwardly extending portion of said flue 22. The space between the plate 25 and the front of the casing is divided into superimposed compartments 27 by partitions 28; said compartments 27 serving as ovens for baking purposes and having doors 29 in the front thereof. Another baffle 30 is positioned at the bottom of the space between the plate 25 and the back 26, and the heat and products of combustion, after passing upwardly through the fire boxes, will be deflected by the baffle 23 downwardly behind the ovens 27, after which it will pass through a chamber 31 in back of the chute 20 and ash receptacle 21 and will finally be deflected by another baffle 32 upwardly between the back 26 and another plate 33 at the opposite side of the casing. After passing upwardly between the back 26 and the plate 33, the products of combustion can be directed by any suitable flue pipe to the atmosphere. The space between the plate or partition 33 and the front of the casing 10 is divided into compartments 34 by shelves or partitions 35, and these compartments form ovens; it being noted that as the hot products of combustion pass through the flue as above described that they will heat the ovens 27 and 34 on their way to the atmosphere. The ovens 34 are provided with doors 36 which are of the same construction as the doors 29 above described. It will be further noted that by the arrangement of the fire boxes between the ovens 27 and 34 that said ovens will be heated directly from the fire boxes in addition to the heat absorbed from the products of combustion as they are passing through the flues. This construction provides a compact and convenient device which can be easily attended since the ovens are positioned so that they can be quickly and easily opened.

A steam boiler 37 is positioned in the space between the tops of the fire boxes 11 and the baffle 23. This steam boiler is connected by suitable piping 38 to a steam engine 39, said steam engine being operatively connected to a shaft 40 so as to rotate said shaft. The shaft 40 is mounted in bearings 41 on a bracket 42 secured to the front of the casing 10. The bracket 42 supports rotatable vertical shafts 43 which have bevel gear wheels 44 which mesh with other bevel gear wheels 45 on said shaft 40. The shafts 43 are coupled, by universal couplings 46 to rods 47 which have hooks 48 on their lower ends adapted to support food, to be roasted or broiled, in front of the grates 15. It will be noted that the hooked rods 47 will be rotated due to the operation of the engine 39 so as to rotate the food in front of the grates 15. Brackets 49 are secured to the front of the casing 10 and have their opposite edges 50 provided with notches 51, said notches being disposed so as to receive the rods 47 and hold them in position at various distances from the fire boxes during the rotation of the shafts. In this manner the food can be moved toward or from the fire boxes to vary the degree of cooking.

One of the most important features of my invention is the grouping of a number of the fire boxes 11 with comparatively narrow alleys provided therebetween, such for example as the alleys 13. With this construction steaks, chops, etc., can be hung edgewise within the alleys so as to be broiled or cooked simultaneously on opposite sides by heat of two of the adjacent fire boxes. Any suitable means can be employed for suspending or supporting the steaks, chops or the like within the alleys 13 and, as illustrated, I have included eyelets 52 which are mounted to permit any suitable means such as hooks or grid irons (not illustrated) having a steak thereon to be suspended within the alleys.

The top rails 17 of the front grates 15 provide a support for griddle plates 53, upon which griddle cakes can be cooked, and these plates 53 are preferably made so they can be slid out to permit access to the fire boxes and for cleaning purposes. A water tank 54 is positioned above the fire boxes to the rear of the steam boiler 37 and is connected by suitable piping 55, whereby hot water can be drawn therefrom for various uses.

A cooking device made in accordance with my invention as above set forth is extremely convenient since it permits of the cooking of food in various ways and at the same time occupies comparatively little space. All of the parts are easily accessible so that it requires comparatively little movement of an attendant in order to be able to attend to the cooking of foods. With my improved device various styles of cooking can be readily accomplished, such for example as the broiling of steaks or chops, the making of griddle cakes, the baking within the ovens and the roasting in front of the grates 15. Furthermore, the front of the device has no projection which compels an attendant to lean over in order to properly manipulate the food being cooked.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A cooking device including a casing; fuel-containing means within said casing; means providing ovens at opposite sides of said fuel-containing means; and a flue having a portion communicating with said fuel-containing means, said flue extending from said fuel-containing means downwardly behind the ovens on one side and then upwardly behind the ovens on the opposite side; substantially as described.

In testimony whereof I have signed my name to this specification in the presence of two subscribing witnesses.

GEORGE TSEKURAS.

Witnesses:
DAVID NEWMAN,
CHAS. E. POTTS.